US012573886B2

(12) United States Patent
Nerheim et al.

(10) Patent No.: US 12,573,886 B2
(45) Date of Patent: Mar. 10, 2026

(54) LAMINAR COIL ARRAY IN A MULTI-DEVICE WIRELESS CHARGER

(71) Applicant: AIRA, INC., Chandler, AZ (US)

(72) Inventors: Magne Nerheim, Paradise Valley, AZ (US); Mohammad Ali Saket Tokaldani, Vancouver (CA); Eric Heindel Goodchild, Phoenix, AZ (US)

(73) Assignee: AIRA, INC., Phoenix, AZ (US)

( * ) Notice: Subject to any disclaimer, the term of this patent is extended or adjusted under 35 U.S.C. 154(b) by 795 days.

(21) Appl. No.: 17/874,265

(22) Filed: Jul. 26, 2022

(65) Prior Publication Data

US 2023/0035141 A1 Feb. 2, 2023

Related U.S. Application Data

(60) Provisional application No. 63/227,971, filed on Jul. 30, 2021.

(51) Int. Cl.

| | |
|---|---|
| *H02J 7/00* | (2006.01) |
| *H01F 1/34* | (2006.01) |
| *H01F 41/04* | (2006.01) |
| *H02J 50/00* | (2016.01) |
| *H02J 50/12* | (2016.01) |
| *H02J 50/40* | (2016.01) |
| *H04B 5/79* | (2024.01) |

(52) U.S. Cl.
CPC ............ *H02J 50/402* (2020.01); *H01F 1/344* (2013.01); *H01F 41/04* (2013.01); *H02J 50/005* (2020.01); *H02J 50/12* (2016.02); *H04B 5/79* (2024.01)

(58) Field of Classification Search
CPC ........ H02J 50/402; H02J 50/005; H02J 50/12; H04B 5/79; H01F 1/344; H01F 41/04
USPC .......................................... 320/108; 307/104
See application file for complete search history.

(56) References Cited

U.S. PATENT DOCUMENTS

| | | |
|---|---|---|
| 2015/0364244 A1 | 12/2015 | Tsai et al. |
| 2017/0317517 A1 | 11/2017 | Chiu et al. |
| 2018/0090954 A1* | 3/2018 | Graham ................. H02J 50/70 |
| 2019/0334391 A1 | 10/2019 | Qi et al. |

(Continued)

FOREIGN PATENT DOCUMENTS

EP      3675323 A1    7/2020

OTHER PUBLICATIONS

PCT/US2022/038455. International Search Report & Written Opinion (Dec. 15, 2022).

(Continued)

*Primary Examiner* — Zixuan Zhou
(74) *Attorney, Agent, or Firm* — Anthony Smyth

(57) ABSTRACT

Systems, methods and apparatus for wireless charging are disclosed. A wireless charging device has a plurality of planar power transmitting coils arranged in two or more layers between a charging surface and a ferrite layer, and a driver circuit configured to provide a charging current to one or more of the plurality of planar power transmitting coils when a chargeable device is placed on or near the wireless charging device. Each planar power transmitting coil may be formed as a spiral winding surrounding a power transfer area. Inductance of each of the plurality of planar power transmitting coils measured at the charging surface varies from a nominal inductance value by less than ten percent.

13 Claims, 18 Drawing Sheets

1300

(56) References Cited

U.S. PATENT DOCUMENTS

2021/0083525 A1    3/2021   Stingu et al.
2021/0210282 A1    7/2021   Goodchild et al.

OTHER PUBLICATIONS

Corresponding EP Patent Application No. 22850223.3. Extended
Search Report (May 14, 2025).

* cited by examiner

202

202

202

202

202

200

Transfer Area
902

1000

1122

1124

1126

1120

1100

1300

1310 →

1318    4d 1316    3d 1314    2d 1312    d

1320

Layer 4 Coil 1308

Layer 3 Coil 1306

Layer 2 Coil 1304

Layer 1 Coil 1302

Ferrite

Figure 14:
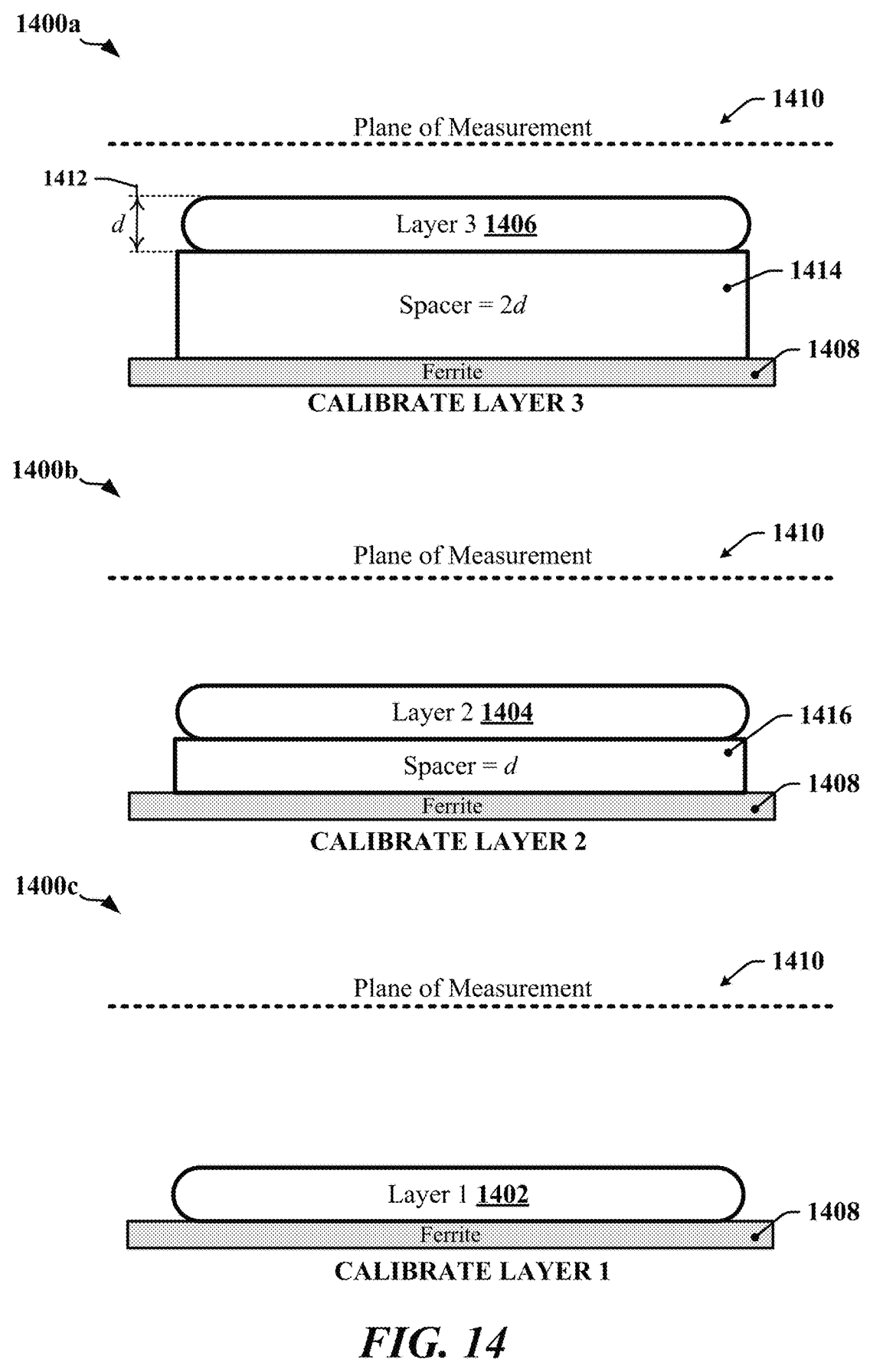

1400a

1410

Plane of Measurement

1412

$d$

Layer 3 1406

Spacer = 2$d$    1414

Ferrite    1408

CALIBRATE LAYER 3

1400b

1410

Plane of Measurement

Layer 2 1404    1416

Spacer = $d$

Ferrite    1408

CALIBRATE LAYER 2

1400c

1410

Plane of Measurement

Layer 1 1402

Ferrite    1408

CALIBRATE LAYER 1

LAYER 4

1512

$id_4$ $n_4$

1504

LAYER 3

1514

$id_3$ $n_3$

1510

| Example |
|---|
| Layer 4: $n_4 = 37$, $id4 = $ 6mm |
| Layer 3: $n_3 = 30$, $id4 = $ 10mm |
| Layer 2: $n_2 = 25$, $id4 = $ 16mm |
| Layer 1: $n_1 = 24$, $id4 = $ 17mm |

1506

LAYER 2

1516

$id_2$ $n_2$

1508

LAYER 1

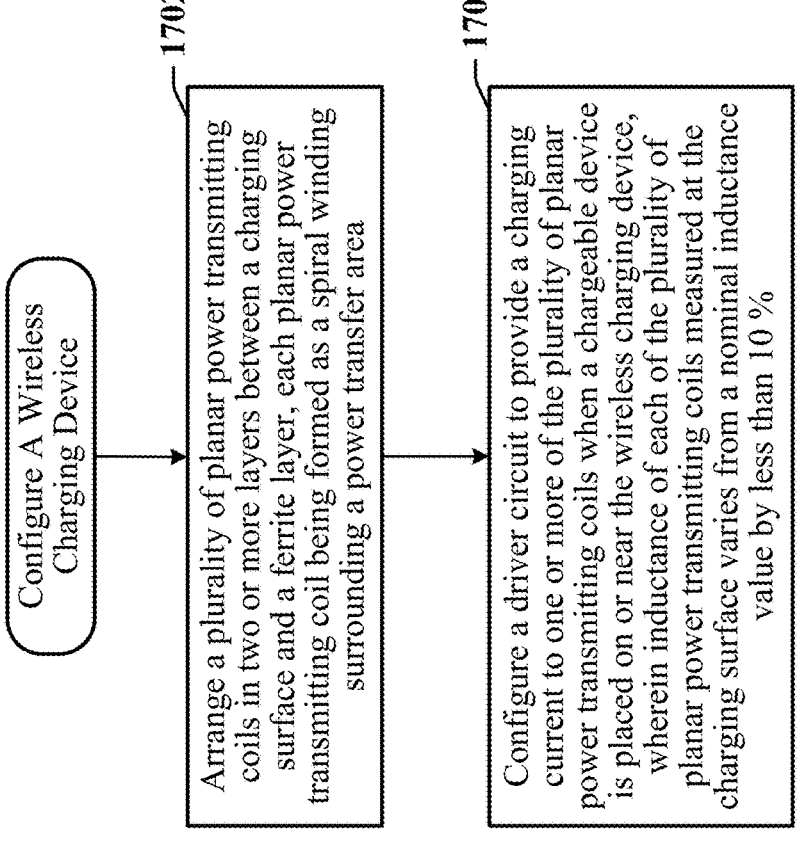

1700

1702

Configure A Wireless Charging Device

Arrange a plurality of planar power transmitting coils in two or more layers between a charging surface and a ferrite layer, each planar power transmitting coil being formed as a spiral winding surrounding a power transfer area

1704

Configure a driver circuit to provide a charging current to one or more of the plurality of planar power transmitting coils when a chargeable device is placed on or near the wireless charging device, wherein inductance of each of the plurality of planar power transmitting coils measured at the charging surface varies from a nominal inductance value by less than 10 %

*FIG. 17*

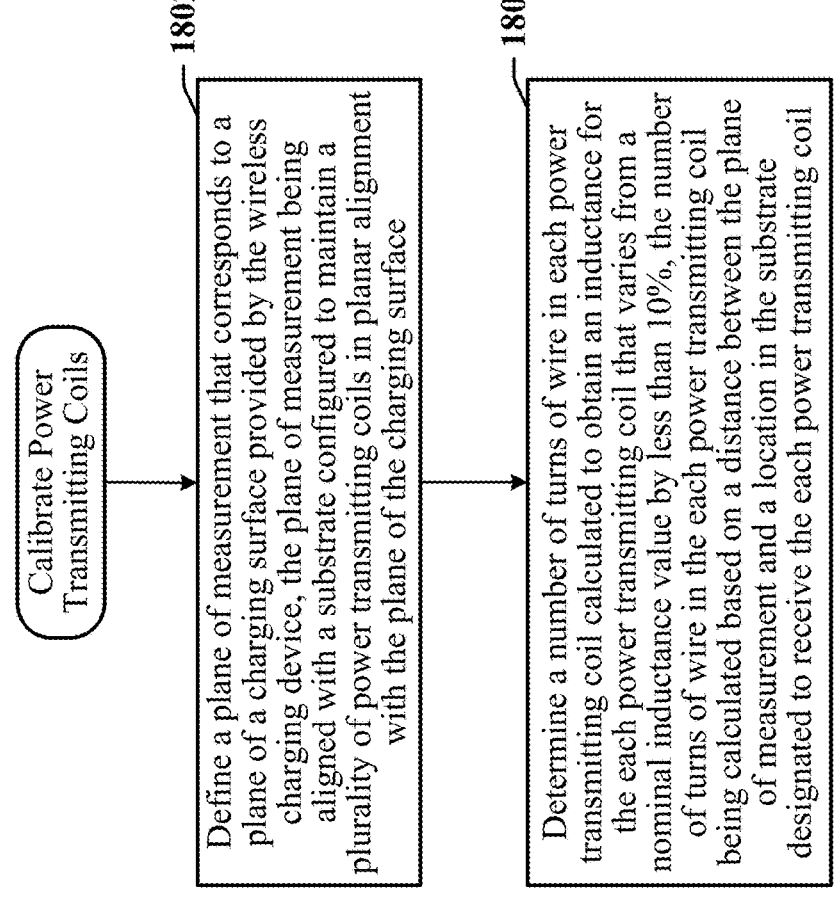

Calibrate Power Transmitting Coils

1802

Define a plane of measurement that corresponds to a plane of a charging surface provided by the wireless charging device, the plane of measurement being aligned with a substrate configured to maintain a plurality of power transmitting coils in planar alignment with the plane of the charging surface

1804

Determine a number of turns of wire in each power transmitting coil calculated to obtain an inductance for the each power transmitting coil that varies from a nominal inductance value by less than 10%, the number of turns of wire in the each power transmitting coil being calculated based on a distance between the plane of measurement and a location in the substrate designated to receive the each power transmitting coil

LAMINAR COIL ARRAY IN A MULTI-DEVICE WIRELESS CHARGER

PRIORITY CLAIM

This application claims priority to and the benefit of provisional patent application No. 63/227,971 filed in the United States Patent Office on 30 Jul. 2021, and the entire content of this application is incorporated herein by reference as if fully set forth below in its entirety and for all applicable purposes.

TECHNICAL FIELD

The present invention relates generally to wireless charging of batteries, including batteries in mobile computing devices, and more particularly to calibrating laminar inductive coils in a wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors and to support new uses of wireless charging devices. For example, there is a need for rapid, optimized and consistent wireless power transfers when multiple devices can be placed in various locations on a charging surface for concurrent charging.

BRIEF DESCRIPTION OF THE DRAWINGS

FIG. 14 illustrates different models that can be used to determine a configuration of coils in accordance with certain aspects disclosed herein.

FIG. 15 illustrates an example of coils provided in accordance with certain aspects disclosed herein.

FIG. 17 illustrates a method for configuring a charging device in accordance with certain aspects of this disclosure.

FIG. 18 illustrates a method for calibrating power transmitting coils in a wireless charging device in accordance with certain aspects of this disclosure.

DETAILED DESCRIPTION

Figure 1:
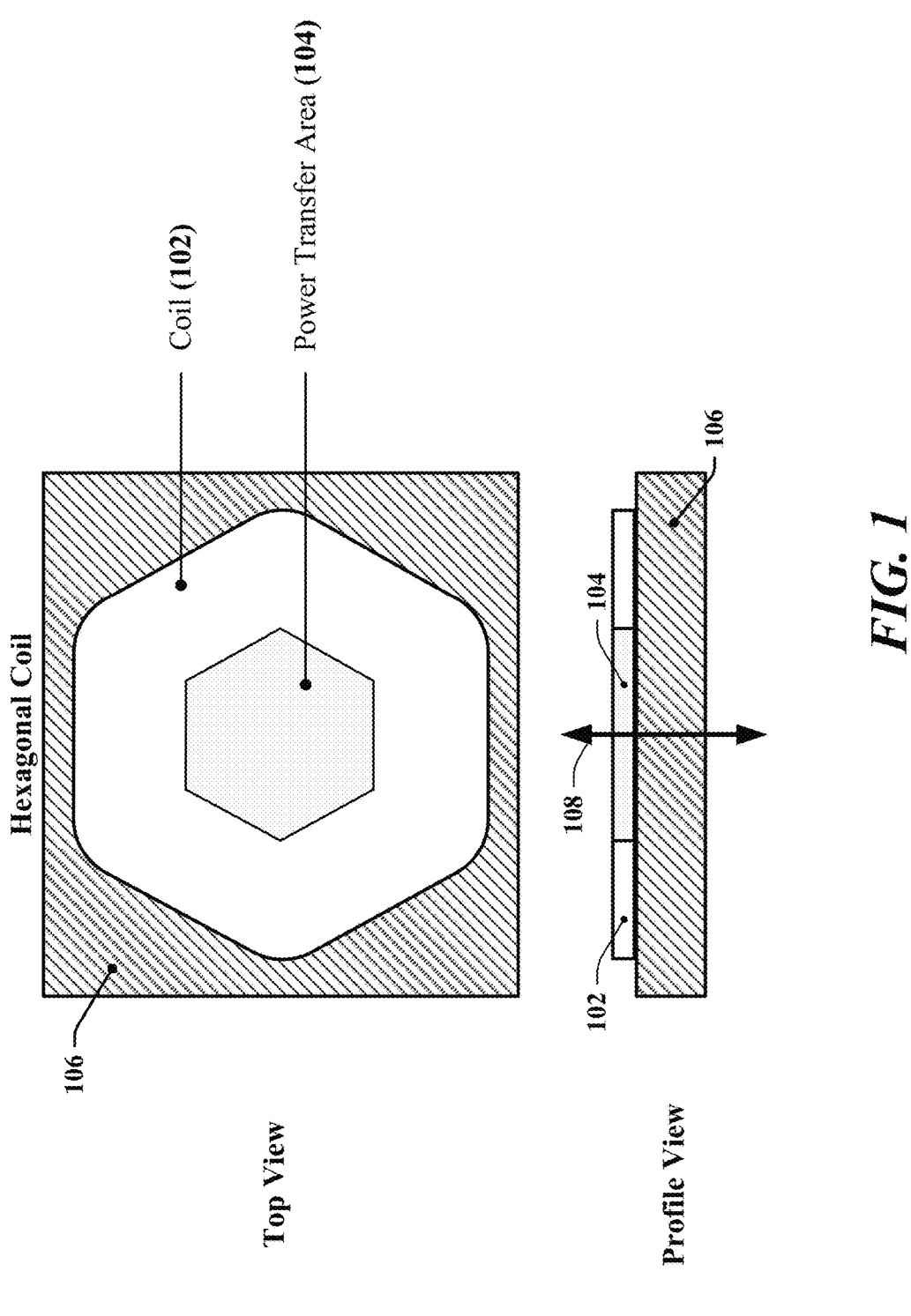
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), finite state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods associated with wireless charging devices that provide a free-positioning charging surface using multiple transmitting coils, and/or that can concurrently charge multiple receiving devices. In one example, a controller in a wireless charging system or device configured or adapted in accordance with certain aspects of this disclosure can locate a device to be charged and can configure one or more transmitting coils optimally positioned to deliver power to the receiving device. Charging cells may be provisioned or configured with one or more inductive transmitting coils and multiple charging cells may be arranged or configured to provide a charging surface of desired shape and size. In some instances, a wireless charging system may provide multiple charging surfaces, each having multiple charging cells where the charging surfaces can be distributed across within a room, seating area, vehicle or building. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing. In some examples, the presence of the device to be charged near a transmitting coil may alter the frequency of resonance, quality factor (Q-factor) or impedance of a resonant circuit coupled to the transmitting coil. In some instances, the placement of the device to be charged near the transmitting coil may be detected using measurements of voltage, current, changes in voltage or changes in current. In some instances, the presence of the device to be charged may be detected or confirmed using some combination of capacitive sensing, passive ping and active or digital ping.

In one aspect of the disclosure, a wireless charging device has a plurality of planar power transmitting coils and a driver circuit. The plurality of planar power transmitting coils is arranged in two or more layers between a charging surface and a ferrite layer. Each planar power transmitting coil is formed as a spiral winding surrounding a power transfer area. The driver circuit may be configured to provide a charging current to one or more planar power transmitting coils when a chargeable device is placed on or near the wireless charging device. Inductance of each of the plurality of planar power transmitting coils may be measured at the charging surface varies from a nominal inductance value by less than 10%.

In one example, a charging surface has multiple charging cells. Each charging cell includes at least one Litz coil constructed using a Litz wire to form a planar or substantially flat winding. The Litz coil may be configured with a central power transfer area that produces an electromagnetic flux when a charging current is passed through the Litz wire. Each charging cell may include or be associated with multiple Litz coils arranged to have coaxial or overlapping power transfer areas. In some instances, the charging cells may be arranged parallel to, and adjacent to the charging surface of the charging device without overlap of the charging cells. In some instances, the charging cells may be arranged in multiple parallel layers, extending from a first layer that is parallel to, and adjacent to the charging surface of the charging device. In some instances, Litz coils in each layer may at least partially overlap Litz coils in other layers.

Charging Cells

According to certain aspects disclosed herein, a charging surface provided in a wireless charging device may define or be constructed from charging cells that are deployed adjacent to a surface of the charging device. In one example the charging cells are deployed in one or more layers of the charging surface in accordance with a honeycomb packaging configuration. A charging cell may be implemented using one or more coils, where each coil is configured to induce a magnetic field along an axis that is substantially orthogonal to the charging surface adjacent to the coil when an alternating current is passed through the coil. An alternating current that produces a magnetic field sufficient to transfer power to a chargeable device may be referred to as a charging current or an activating current herein. In this disclosure, a charging cell may refer to an element having one or more coils where each coil is configured to produce an electromagnetic field that is additive with respect to the fields produced by other coils in the charging cell and directed along or proximate to a common axis. In this disclosure, a coil in a charging cell may be referred to as a charging coil, a transmitting coil, a Litz coil or using some combination of these terms.

In some examples, a charging cell includes coils that are stacked along a common axis and/or that overlap such that they contribute to an induced magnetic field that is substantially orthogonal to the charging surface. In some examples, a charging cell includes coils that are arranged within a defined portion of the charging surface and that contribute to an induced magnetic field within the defined portion of the charging surface, the magnetic field contributing to a magnetic flux flowing substantially orthogonal to the charging surface. In some implementations, a dynamically defined charging cell may be configured through the selection of coils that are to receive an activating current. For example, a wireless charging device may include multiple stacks of coils deployed across a charging surface, and the wireless charging device may detect that a device to be charged is adjacent to one or more adjacent stacks of coils. The wireless charging device may select some combination of the adjacent stacks of coils to provide a charging cell for the device to be charged. A charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface in a wireless charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. In some implementations, one or more coils may have a flat spiral shape or a shape that is substantially circular. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment or portion of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
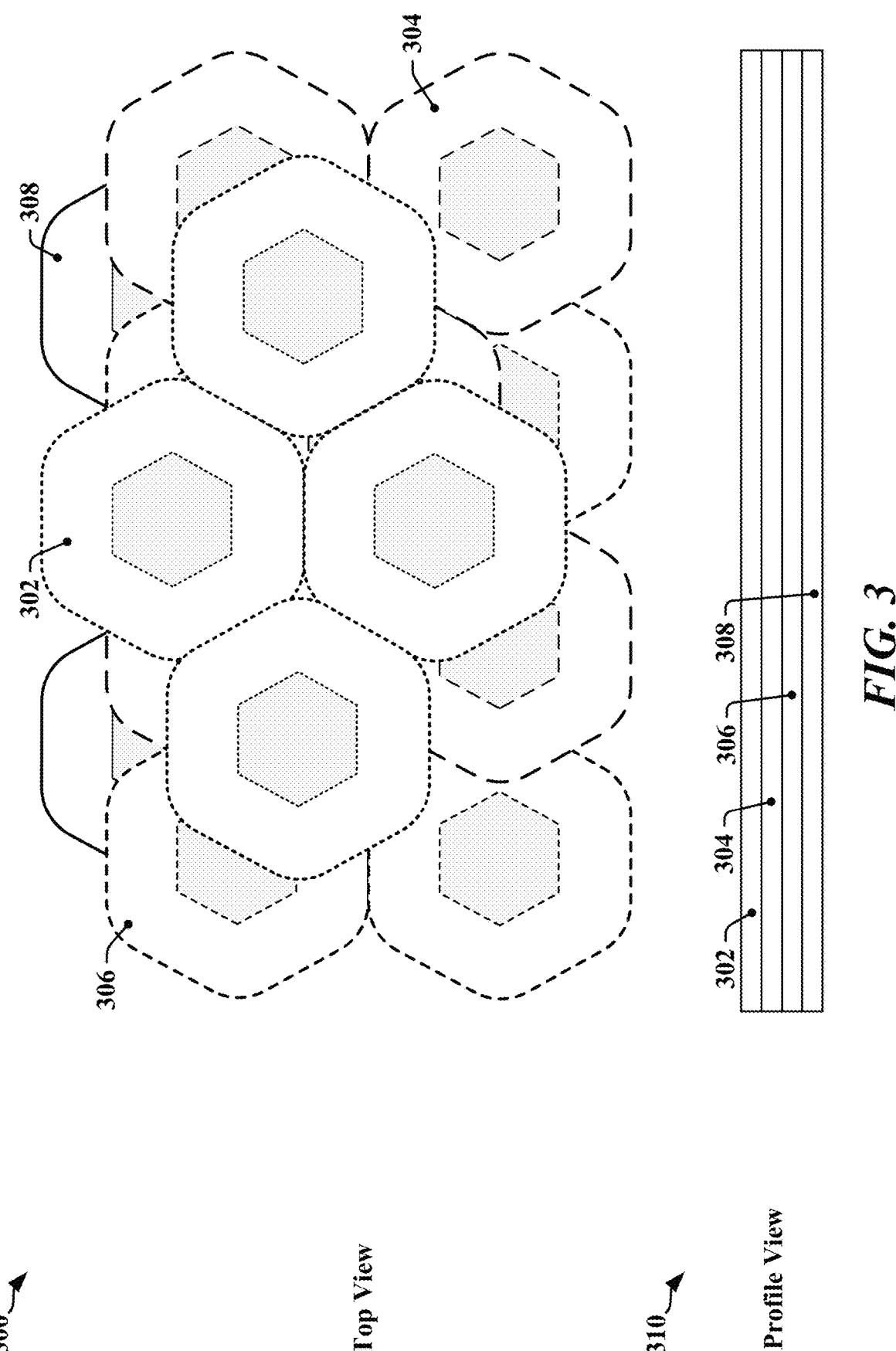
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. Layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
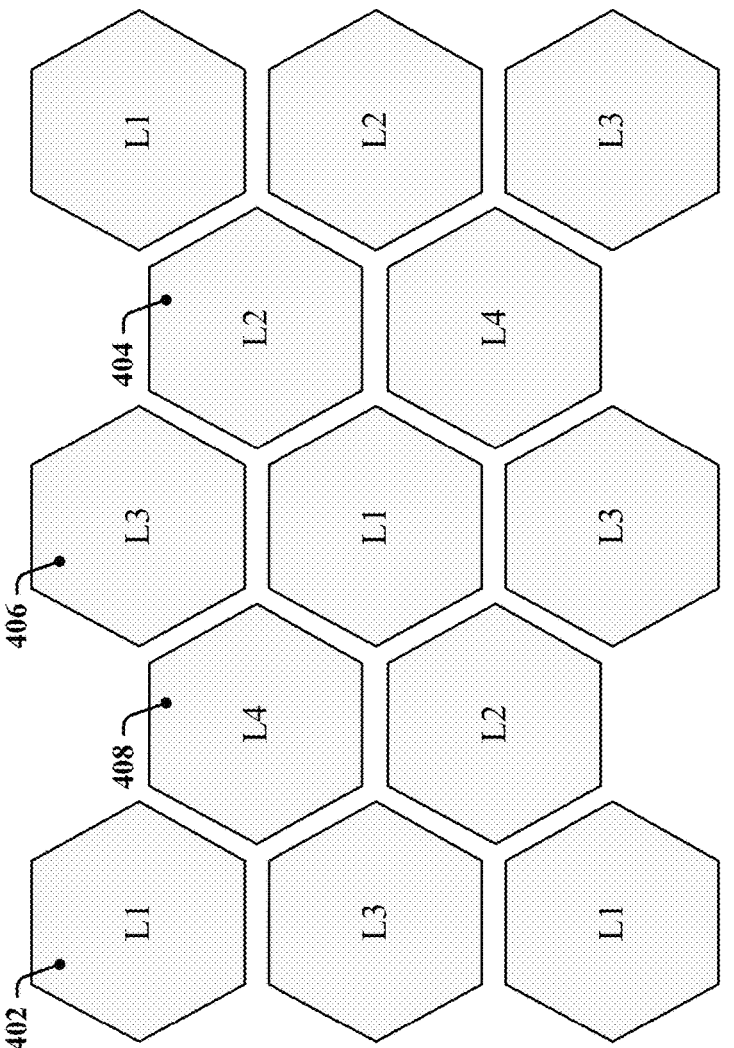
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas provided across a charging surface 400 of a charging device that employs multiple layers of charging cells configured in accordance with certain aspects disclosed herein. The charging device may be constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
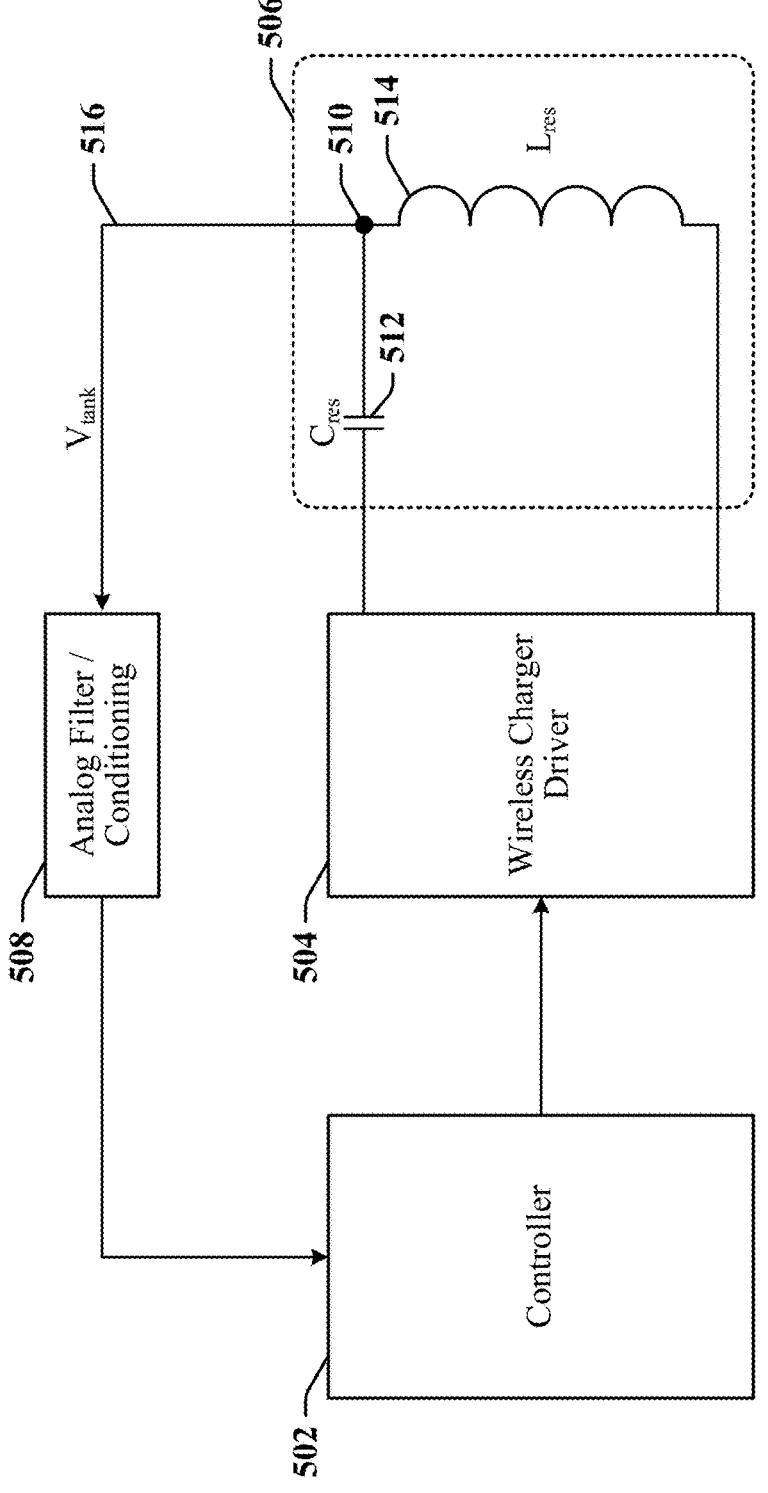
FIG. 5 illustrates a wireless transmitter that may be provided in a charger base station in accordance with certain aspects disclosed herein.

FIG. 5 illustrates an example of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 may generate a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil of a chargeable device that is in proximity to the charging surface of a device adapted in accordance with certain aspects disclosed herein. The presence of the receiving coil can modify the inductance of the resonant circuit 506, and thereby change the resonant frequency and/or the pulse response of the resonant circuit 506. Some conventional wireless charging devices include circuits that measure voltage at the LC node 510 of the resonant circuit 506 or the current in the resonant circuit

506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage $V_{LC}$ observed at the LC node 510, such that:

$$V_{LC} = V_0 e^{-\left(\frac{\omega}{2Q}\right)t}.$$  (Eq. 1)

The resonant circuit 506 may be monitored when the controller 502 or another processor is using digital pings to detect presence of objects. A digital ping is produced by driving the resonant circuit 506 for a period of time and monitoring the current or voltage waveform in the resonant circuit 506 for modulated signals. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor may determine that a data modulated response indicates that a receiving device is nearby.

Selectively Activating Coils

According to certain aspects disclosed herein, power transmitting coils in one or more charging cells may be selectively activated to provide an optimal electromagnetic field for charging a compatible device. In some instances, power transmitting coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single power transmitting coil or a combination of power transmitting coils based on the charging configuration which in turn is based on detection of location of the device to be charged. In some implementations, a wireless charging device may have a driver circuit that can selectively activate one or more power transmitting coils or one or more predefined charging cells during a charging event.

Figure 6:
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with $\sqrt{N}$ switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
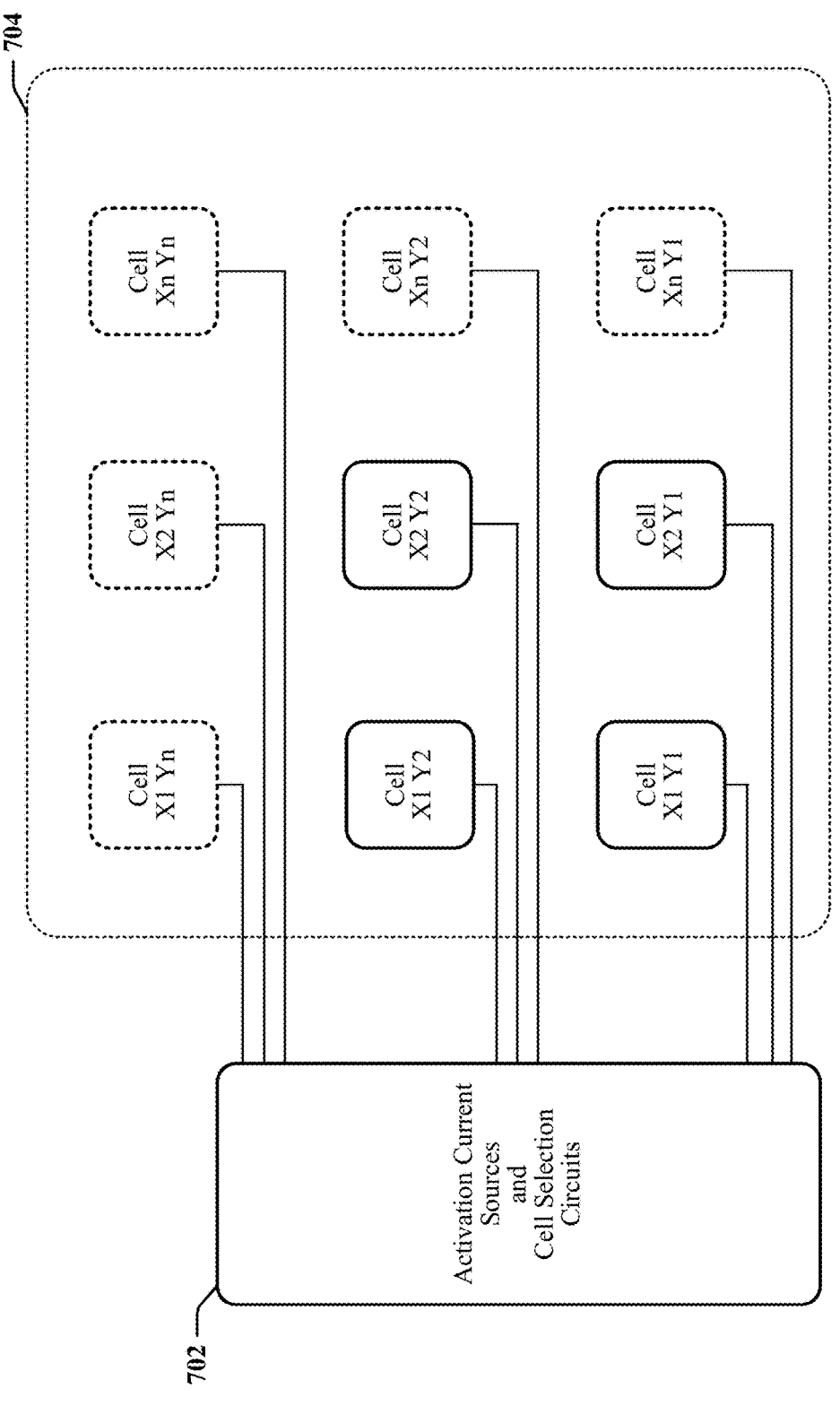
FIG. 7 illustrates a second topology that supports direct current drive in a wireless charging device adapted in accordance with certain aspects disclosed herein.

FIG. 7 illustrates a second topology 700 in which each individual coil or charging cell is directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Figure 8:
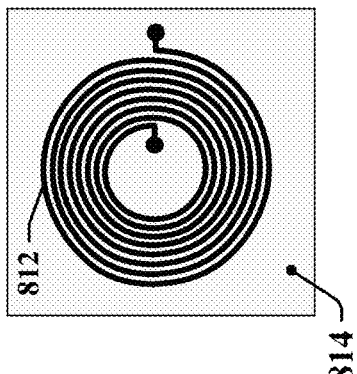
FIG. 8 illustrates a charging cell layout configured in accordance with certain aspects of this disclosure.
Figure 8:
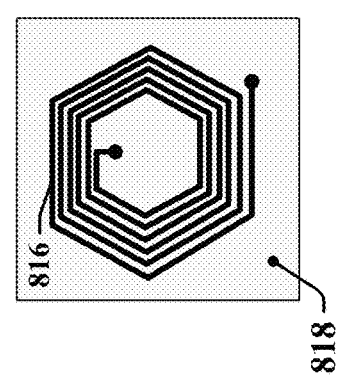

FIG. 8 illustrates a charging cell layout 800 configured in accordance with certain aspects of this disclosure. In the illustrated example, the charging cell layout 800 is provided using a four-layer structure implemented on the metal layers of a pair of two-layer printed circuit boards (PCBs) 822 or 824 that are bonded or joined by an insulating adhesive layer 826. In other examples, the four-layer structure may be implemented on the metal layers of a single four-layer printed circuit board (PCB). In the illustrated example, an active charging cell 802 is provided on a first layer of a four-layer structure and charging cells 804, 806, 808 provided on the other three layers may have windings that overlap the windings of the active charging cell 802. In one example, each charging cell includes a transmitting coil that has a winding formed as a decreasing radius trace 812 or 816 on one side of a PCB 822 or 824. In one example, the decreasing radius trace 812 has a substantially smooth curved spiral shape. In another example, the decreasing radius trace 816 is segmented and generally hexagonal in shape. The decreasing radius traces 812 and 816 may be provided adjacent a magnetic core material 814 and 818, respectively. The magnetic core material 814 and 818 may be formed from a low coercivity material such as a soft ferrite. In one example, the magnetic core material 814 and 818 is integrated in an adhesive layer. In another example, the magnetic core material 814 and 818 may be attached to an adhesive layer or sandwiched between adhesive layers.

A partial view 820 of a lateral cross-section 810 of the two-layer PCBs 822 or 824 illustrates further aspects of charging cell layout 800. In some examples, a charging cell 804 in the second layer, a charging cell 806 in the third layer and a charging cell 808 in the second layer partially overlap the active charging cell 802. Portions of the metal layers 832, 834, 836 and 838 occupied by windings are shown in solid black, with individual traces not being explicitly shown. Each of the metal layers 832, 834, 836 and 838 is provided on a side of a PCB 822 or 824. A planar magnetic core 842 is provided between the two adjacent metal layers 834 and 836 of the PCBs 822 and 824. The planar magnetic core 842 may be included in an adhesive layer or between adhesive layers 826, 828. The planar magnetic core 842 and the adhesive layers 826, 828 are electrically non-conductive.

Challenges facing single-coil and multi-coil wireless charging systems that use transmitting coils formed on PCBs include inefficient power delivery due to the current carrying capabilities of traces that form or supply the transmitting coils, skin effects, eddy currents induced from adjacent windings, and other electromagnetic issues. Skin effect losses occur in traces or wires carrying high frequency signals where the current tends to flow at outermost reaches (skin) of the trace or wire. The concentration of current in the skin of the trace or wire can effectively increase resistance of the trace or wire due to a reduction in the percentage of cross-sectional area of the trace or wire that is used to carry a high-frequency alternating current (AC). Increasing demands for higher power transfer rates in wireless charging devices can be at least partially met by improving the efficiency of power transmission through the transmitting coils of a wireless charging device. Conventional receiving devices may demand up to 5 W maximum from the transmitter, while next generations of receiving devices can demand 15 W or more to expedite the charging process.

Transmitted power may be increased through improvements in transmitting coil design and associated manufacturing techniques. In one example, multiple individual wire-formed transmitting coils may be assembled and maintained in alignment using a substrate that receives the coils in preassigned three-dimensional (3D) locations.

Figure 9:
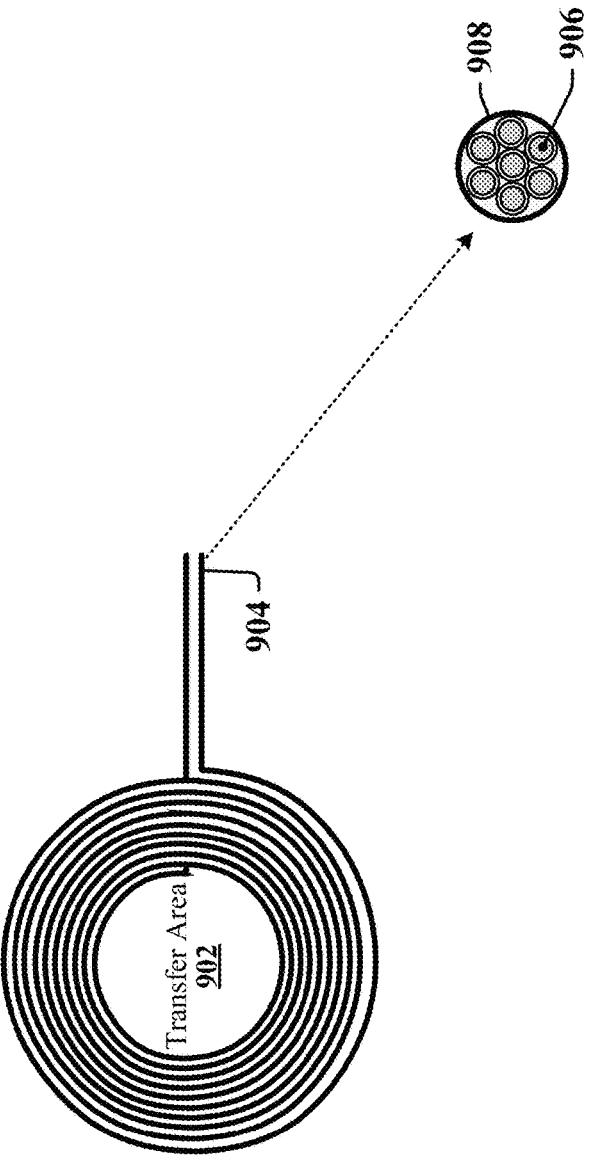
FIG. 9 illustrates an example of a Litz transmitting coil configured in accordance with certain aspects of this disclosure.
Figure 9:

FIG. 9 illustrates an example of a transmitting coil configured in accordance with certain aspects of this disclosure. The transmitting coil may be wound from a multi-stranded Litz wire 904 and may be referred to as a Litz coil 900. Each strand 906 of the Litz wire 904 is formed as an insulated conductor that is sufficiently thin to mitigate or substantially reduce skin effect loss. Skin effect losses occur in wires carrying high frequency signals where the current tends to flow at outermost reaches (skin) of the wire. The strands 906 are insulated to maintain their individual nature and are twisted such that the relative positioning of the individual strands 906 changes over the length of the Litz wire 904. In some instances, the strands 906 are bound by an exterior insulating layer 908. The Litz coil 900 is wound as a substantially planar coil with an open interior that corresponds to the power transfer area 902.

Figure 10:
FIG. 10 illustrates an example of a portion of a charging surface provided multiple overlapping Litz coils in accordance with certain aspects of this disclosure.

FIG. 10 illustrates an example of a portion of a charging surface 1000 provided using multiple overlapping Litz coils 900. In the illustrated example, the charging surface 1000 is constructed using three layers of Litz coils 900, although the number of layers of Litz coils 900 and arrangement of the Litz coils 900 in the charging surface 1000 may vary according to application, size of the charging surface 1000 and power transfer requirements per Litz coil 900.

The configuration of Litz coils 900 in a charging surface 1000 may be precisely defined by design requirements. In some instances, it can be difficult to manage and align the number of Litz coils 900 to be assembled during manufacture of a wireless charging device that provides a free-positioning charging surface using multiple transmitting coils. Variability in positioning of the Litz coils 900 during manufacture can result in imprecise configurations of coils in some finished devices. In some instances, the Litz coils 900 may be retained in position using an adhesive or epoxy resin. However, the Litz coils 900 must be accurately positioned before application of the adhesive or resin, and movement caused during application of the adhesive or resin may affect the operation of the finished wireless charging device. According to certain aspects of this disclosure, a substrate may be configured to receive the Litz coils 900 and maintain the Litz coils 900 in a desired configuration for the lifetime of the wireless charging device.

Figure 11:
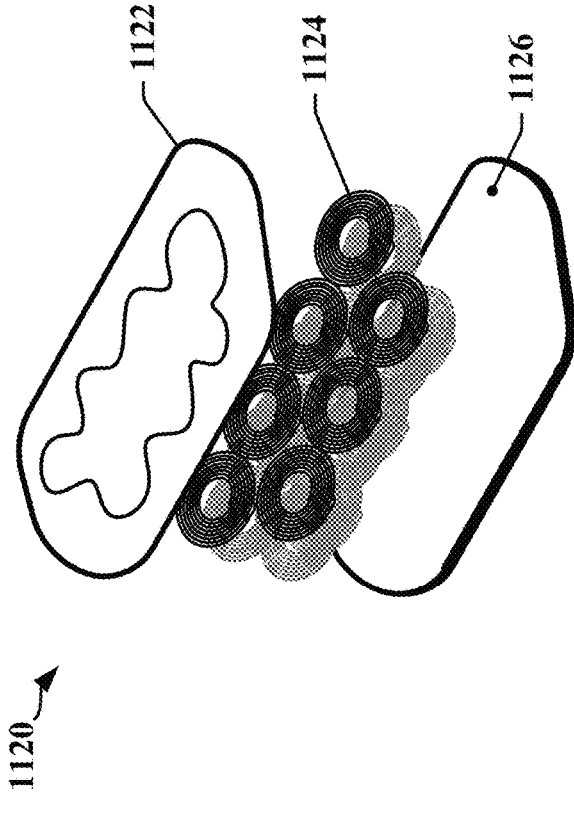
FIG. 11 illustrates a charging surface of a wireless charging device constructed from Litz coils in accordance with certain aspects of this disclosure.
Figure 11:
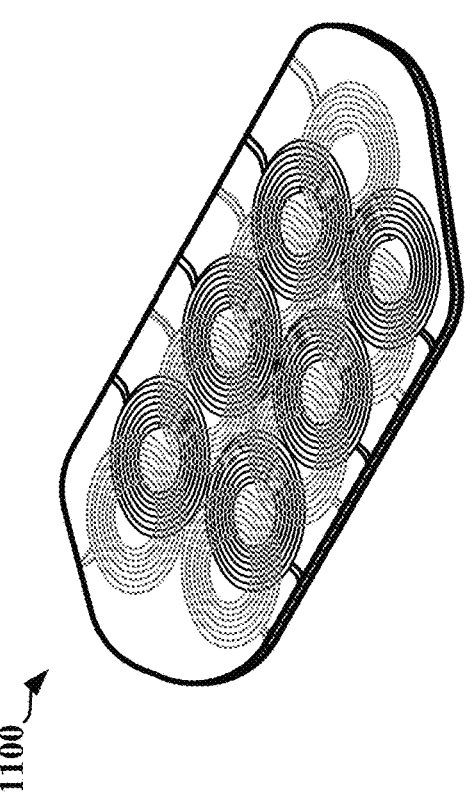

FIG. 11 illustrates a charging surface 1100 of a wireless charging device constructed from Litz coils 900 in accordance with certain aspects of this disclosure. The exploded view 1120 shows a Litz coil substrate 1122 configured to receive Litz coils and maintain the Litz coils in a predefined multi-layer Litz coil structure 1124 with 3D displacements between coils that meet tolerances defined by a designer. The Litz coil substrate 1122 may also define the spatial relationship between the multi-layer Litz coil structure 1124 and a ferrite layer 1126 or another type of magnetic half-core.

Figure 12:
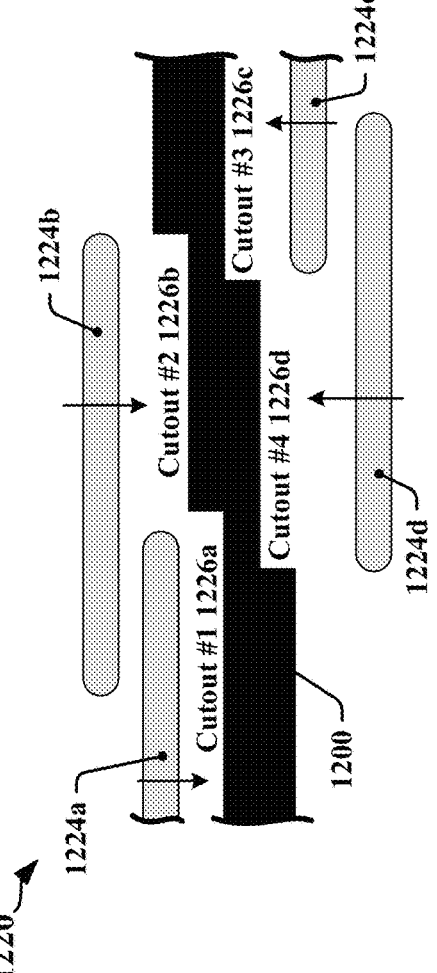
FIG. 12 illustrates certain aspects of a Litz coil substrate provided in accordance with certain aspects of this disclosure.
Figure 12:
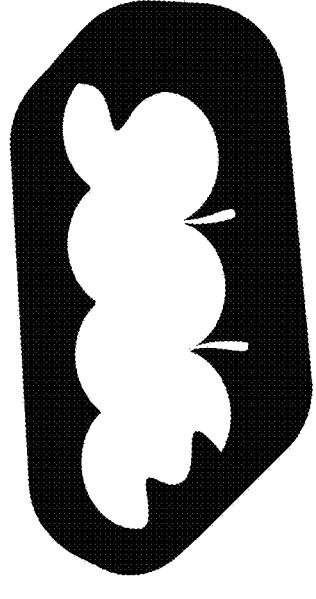

FIG. 12 illustrates certain aspects of a Litz coil substrate 1200 provided in accordance with certain aspects of this disclosure. The Litz coil substrate 1200 may be formed from a polymer, acetate, vinyl, nitrile rubber, latex, extruded polystyrene foam and/or other material. The Litz coil substrate 1200 may have multiple cutouts that enable the Litz coils 900 to be placed in position in an ordered assembly. In some examples, the cutouts may be preformed when the Litz coil substrate 1200 is manufactured by 3D printing, molding, extrusion and/or low-pressure expansion. In some examples, the cutouts may be formed by milling, grinding, etching, abrading, chemical erosion, chemical dissolution or by another technique suitable for use with the material used to form the Litz coil substrate 1200.

Certain aspects of the Litz coil substrate 1200 are illustrated in a cross-sectional view 1220. The illustrated Litz coil substrate 1200 provides a four-layer charging surface and the cross-sectional view 1220 illustrates an example of placement and assembly of four Litz coils 1224a-1224d. The Litz coil substrate 1200 has a deep, first cutout 1226a in the Litz coil substrate 1200 that receives a first Litz coil 1224a. This first cutout 1226a may be formed as a complete circle in some examples. In other examples, the first cutout 1226a may have a portion that overlaps a portion of another cutout in the same plane of the Litz coil substrate 1200.

When the first Litz coil 1224a has been secured within the first cutout 1226a, a second Litz coil 1224b may be placed in a second cutout 1226*b* in the Litz coil substrate 1200. When in position within the Litz coil substrate 1200, the second Litz coil 1224*b* lies in a plane above the plane that includes the first Litz coil 1224*a*. A portion of the second Litz coil 1224*b* overlaps a portion of the first Litz coil 1224*a*. The separation of the planes that include the horizontal center lines of the first Litz coil 1224*a* and the second Litz coil 1224*b* may be configured by the relative difference in depths of the first cutout 1226*a* and the second cutout 1226*b*.

The third Litz coil 1224*c* is received by a deep, third cutout 1226*c* in the Litz coil substrate 1200. This third cutout 1226*c* may be formed as a complete circle in some examples. In other examples, the third cutout 1226*c* may overlap with another cutout in the same plane. In one example, the third cutout 1226*c* may partially overlap the first cutout 1226*a* resulting in a through-hole, when the bottom surface of the first Litz coil 1224*a* is in the same plane as the top surface or some other portion of the third Litz coil 1224*c*.

When the third Litz coil 1224*c* has been secured within the third cutout 1226*c*, a fourth Litz coil 1224*d* may be placed in a fourth cutout 1226*d*. The fourth Litz coil 1224*d* lies in a plane below the plane that includes the third Litz coil 1224*c*. A portion of the fourth Litz coil 1224*d* overlaps a portion of the third Litz coil 1224*c* when secured within the Litz coil substrate 1200. The separation of the planes that include the horizontal center lines of the third Litz coil 1224*c* and the fourth Litz coil 1224*d* may be configured by the relative difference in depths of the third cutout 1226*c* and the fourth cutout 1226*d*.

A Litz coil 1224*a*-1224*d* may be secured within the Litz coil substrate 1200 through a pressure fit, including when the Litz coil substrate 1200 is manufactured from a foam material. In some examples, a Litz coil 1224*a*-1224*d* may be secured within the Litz coil substrate 1200 by adhesive. In some examples, a Litz coil 1224*a*-1224*d* may be secured within the Litz coil substrate 1200 by mechanical means.

Certain aspects of this disclosure can improve the efficiency, consistency and predictability of wireless power transfers from wireless charging devices to receiving devices. According to one aspect, efficiency, consistency and/or predictability of wireless power transfers in a multi-coil free-positioning wireless charging device may be improved by calibrating the transmitting coils with respect to a point, line, area or plane on a charging surface provided by the wireless charging device. As used herein, a free-positioning wireless charging device may refer to a wireless charging device that can be configured to transfer power to a chargeable device regardless of location of the chargeable device on the charging surface provided by the wireless charging device.

In certain implementations, calibration may be used during design, manufacture or configuration of a wireless charging device that is operable to transfer power to a chargeable device been placed on a charging surface of the wireless charging device through the use of laminar transmitting coils arranged in multiple layers near the charging surface. In certain examples, a laminar transmitting coil can be configured or constructed using a thin conductor that may be formed as a spiral winding surrounding a power transfer area. In one example, the conductor may be etched from a metal layer of a PCB or deposited on the surface of the PCB. In another example, the conductor may include a wire such as a Litz wire. In some instances, the spiral winding includes a single layer of wire, where the wire has a thickness that is small fraction of the outer diameter of the spiral winding. For example, a spiral winding that includes 30 turns of wire can have an outer diameter that may be calculated as the sum of the diameter of the power transfer area and 60 times the thickness of the wire. In some implementations, the laminar transmitting coil is maintained in position such that each winding is in substantial planar alignment with the charging surface of the wireless charging device.

According to certain aspects of this disclosure, each transmitting coil in the multiple layers of laminar transmitting coils may be calibrated such that it presents a nominal inductance to a chargeable device. The actual inductance may lie within a range of inductances that includes the nominal inductance and that is specified during design of the wireless charging device. In some instances, the inductance of the transmitting coil may be measured at a point on the charging surface that coincides with an axis of the transmitting coil that is perpendicular to the plane of the laminar coil and/or to the plane of the charging surface. In some instances, the inductance of the transmitting coil may be measured within a power transfer area 104, 902 associated with the transmitting coil on the charging surface and (see FIGS. 1 and 9). In some instances, a laminar transmitting coil may be calibrated by adjusting the number of turns, and/or partial turns of a conductor used to form the laminar transmitting coil. Certain examples involving the calibration of Litz coils are discussed herein. It will be appreciated, however, that various concepts disclosed herein apply equally to other types of transmitting coils, including transmitting coils implemented on the metal layers of PCBs.

Figure 13:
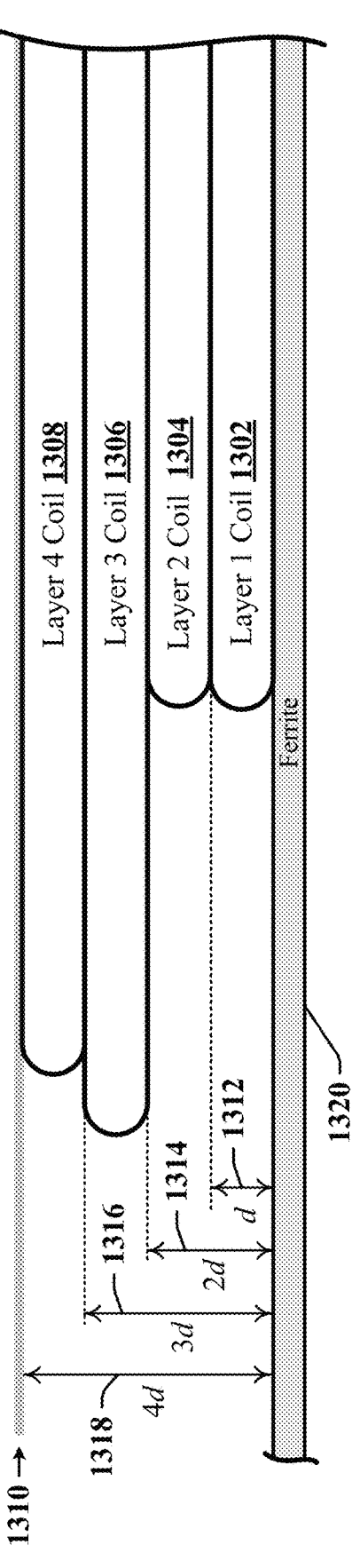
FIG. 13 illustrates a cross-sectional view of an example of a laminar configuration of transmitting coils configured in accordance with certain aspects of this disclosure.

FIG. 13 illustrates a cross-sectional view of an example of a configuration 1300 of transmitting coils 1302, 1304, 1306, 1308 that provide a charging surface 1310 in a multi-coil free-positioning wireless charging device in accordance with certain aspects of this disclosure. In one example, each of the transmitting coils 1302, 1304, 1306, 1308 is a Litz coil. The charging surface 1310 and may be coated with a conformal coating or other overlay. The transmitting coils 1302, 1304, 1306, 1308 may be layered over a ferrite layer 1320. Each of the transmitting coils 1302, 1304, 1306, 1308 has a nominal depth (d). The distances 1312, 1314, 1316, 1318 separating the top surface of each transmitting coil 1302, 1304, 1306, 1308 from the top surface of the ferrite layer 1320 is a multiple of the nominal depth (d).

The variability in location of the transmitting coils 1302, 1304, 1306, 1308 with respect to the charging surface 1310 and the ferrite layer 1320 can result in significant variability of the inductance provided by the transmitting coils 1302, 1304, 1306, 1308 during charging operations. Multiple transmitting coils 1302, 1304, 1306 and/or 1308 may be selected for inclusion in a charging configuration for a chargeable device, and the number and location of the selected transmitting coils 1302, 1304, 1306 and/or 1308 can affect coupling and power transmission efficiency. In one example, the inductor 514 of the resonant circuit 506 in the wireless transmitter 500 of FIG. 5 has an inductance that includes contributions of the selected transmitting coils 1302, 1304, 1306 and/or 1308 and the receiving coil in the chargeable device.

The resonant frequency of the resonant circuit 506 reflects the contributions of transmitting and receiving coils and can affect the quality of coupling between the wireless transmitter 500 and the chargeable device. Changes in coupling and resonant frequency can result in sub-optimal power transfers, with increased energy losses. A charging configuration generated in accordance with certain aspects of this disclosure may define the frequency of a charging current provided to the resonant circuit 506 based on the transmitting coils 1302, 1304, 1306, 1308 selected for transmission of power.

The frequency of the charging current may be calculated based on a knowledge or estimate of the contributions of the selected transmitting coils 1302, 1304, 1306 and/or 1308 to the inductance represented by the inductor 514 of the resonant circuit 506.

The vertical displacement of the planes containing the transmitting coils 1302, 1304, 1306, 1308 can affect associated contributions of inductance. In conventional manufacturing schemes, each of the transmitting coils 1302, 1304, 1306, 1308 may be physically and electromagnetically identical or nearly identical. For example, each transmitting coil 1302, 1304, 1306, 1308 may be manufactured with the same number of turns, the same outside diameter and the same inside diameter. In this example, the transmitting coils 1302, 1304, 1306, 1308 may be interchangeable and each can be expected to provide the same inductance when mounted in a given location. In the configuration 1300 illustrated in FIG. 13, the contribution of each of the transmitting coils 1302, 1304, 1306, 1308 measured at the charging surface 1310 is likely to be significantly different based on difference in vertical distance from the ferrite layer 1320. In certain implementations, the contributions of inductance may be normalized based on vertical distance and the resonant frequency can be calculated based on the normalized values of inductance of one or more transmitting coils 1302, 1304, 1306, 1308 that serve as a single active coil or combination of active coils in a charging configuration. Multiple complex calculations may be required when an optimal charging configuration is generated by selecting between different combinations of transmitting coils 1302, 1304, 1306, 1308 based on aggregate coupling or expected power transfer efficiency, for example.

According to certain aspects of this disclosure, generation of a charging configuration can be simplified by configuring transmitting coils 1302, 1304, 1306, 1308 to be deployed in different layers with different characteristics such that, when installed in a charging device, each transmitting coil 1302, 1304, 1306, 1308 presents a uniform inductance to a device positioned on the charging surface 1310. In some instances, the characteristics for each of the transmitting coils 1302, 1304, 1306, 1308 may be determined using a calibration process or through simulation. After calibration or as a result of simulation, the structures and/or configurations of the transmitting coil 1308 in layer 4 and the transmitting coil 1302 in layer 1 may be defined such that both transmitting coils 1302, 1308 exhibit an inductance of, for example, between 33 and 36 μH when measured at the charging surface 1310.

In accordance with certain aspects of this disclosure, a single-coil charging configuration can be generated using calculations that assume an inductance of between 33 and 36 μH regardless of which transmitting coil 1302 or 1308 is selected or used to wirelessly transfer power to a chargeable device. The range of between 33 and 36 μH is presented here as one example, and other wireless charging devices may be configured based on a different nominal surface-measured inductance for transmitting coils 1302, 1304, 1306, 1308. A set of uniform or calibrated inductance values may be maintained by a controller 502 for calculating inductance contributions of a single transmitting coil 1302, 1304, 1306, 1308 and of different combinations of transmitting coils 1302, 1304, 1306, 1308. In some instances, the different combinations need only be distinguished by the number of transmitting coils 1302, 1304, 1306, 1308 to be included in the charging configuration.

According to certain aspects of this disclosure, the configuration of each transmitting coil 1302, 1304, 1306, 1308 may be determined using measurements or calculations based on a model of the transmitting coil 1302, 1304, 1306, 1308 that represents its position in a wireless charging device relative to the charging surface 1310 and the ferrite layer 1320. FIG. 14 illustrates different models 1400a, 1400b, 1400c that can be used to determine configurations or characteristics of coils 1402, 1404, 1406 located in three layers in order to match the inductance of a coil (not shown) located in a fourth layer, when measured at, on, or relative to the charging surface 1310 illustrated in FIG. 13.

In one example, a transmitting coil in the fourth layer provides a baseline or calibration inductance, when measured at a plane of measurement 1410 that corresponds to the plane of the charging surface 1310. For the purposes of this description, the baseline or calibration inductance may be specified by design as 34.5 μH±1.5 μH and the fourth layer coil and each of the other coils 1402, 1404, 1406 may be limited to a maximum outside diameter specified as 44.5 mm±0.5 mm. The expected measured inductances of the coils 1402, 1404, 1406 may be controlled or adjusted by selecting or changing the number of turns in the coils 1402, 1404, 1406. In some implementations, turns can be added or removed from the center of the coils, thereby decreasing or increasing the inside diameter without affecting the outside diameter. The configuration of the coils 1402, 1404, 1406 may be calculated or measured for each possible value of wire thickness, which controls the depth (d) 1412 of each layer, and for different configurations of the ferrite layer 1408. In one example, a spacer 1414, 1416 may be used to position certain layers in situ, with respect to the ferrite layer 1408 during measurement or simulation or with respect to the plane of measurement 1410. Turns may be added to the design of a coil when measured or calculated in situ inductance is less than 33 μH. Adding turns decreases the inside diameter of a coil. The number of turns may be reduced when measured or calculated in situ inductance is greater than 36 μH. Reducing the number of turns can increase the inside diameter of a coil.

In some instances, the coil in layer 4 may be redesigned when the inside diameter of the coil does not conform with maximum or minimum values specified for the coil design. In these instances, measurements or simulations may be repeated for each layer.

FIG. 15 illustrates an example of a set of coils 1500 provided in accordance with certain aspects disclosed herein. A layer 4 coil 1502 is provided with a number of turns (n₄) and an inside diameter 1512 (id₄). The configuration of the layer 3 coil 1504, layer 2 coil 1506, and layer 1 coil 1508 may obtained using measurements or calculations to obtain respective numbers of turns (nₓ) and inside diameters 1514, 1516, 1518 (idₓ). The table 1510 in FIG. 15 illustrates on example of coil configuration determined in accordance with certain aspects of this disclosure. The illustrated table 1510 may be based on the integer number of turns needed for each coil 1502, 1504, 1506, 1508 to obtain an inductance that lies within a specified range when measured at a plane of measurement. In other examples, the table 1510 may be developed for coils 1502, 1504, 1506, 1508 that can include a half-turn, a quarter turn or other fractional turn. For example, a second coil may provide an inductance closer to the nominal inductance specified for an application when the coil includes 24¾ turns.

In some implementations, the table 1510 may account for designs that provide more than one ferrite layer 1408 or for designs that provide no ferrite layer. In some implementations, a multi-dimensional table may be generated to account for the effects of a low coercivity substrate, which may correspond to the Litz coil substrate 1200 illustrated in FIG. 12. A low coercivity substrate may be manufactured from a low coercivity material and can have different thickness or be absent in certain locations. A low coercivity layer or substrate may affect the inductance of a coil. In one example, inductance may be increased when a ferrite material is located near the coil. The level of increase in inductance may be dependent on the permeability of the ferrite material and the distance separating the coil and the ferrite material. The effects of the low coercivity substrate may vary across the area of the charging surface and the multi-dimensional table may accommodate layer (depth) of a coil and the effects of the low coercivity substrate expected near the coil when inserted into the substrate.

Example of a Processing Circuit

Figure 16:
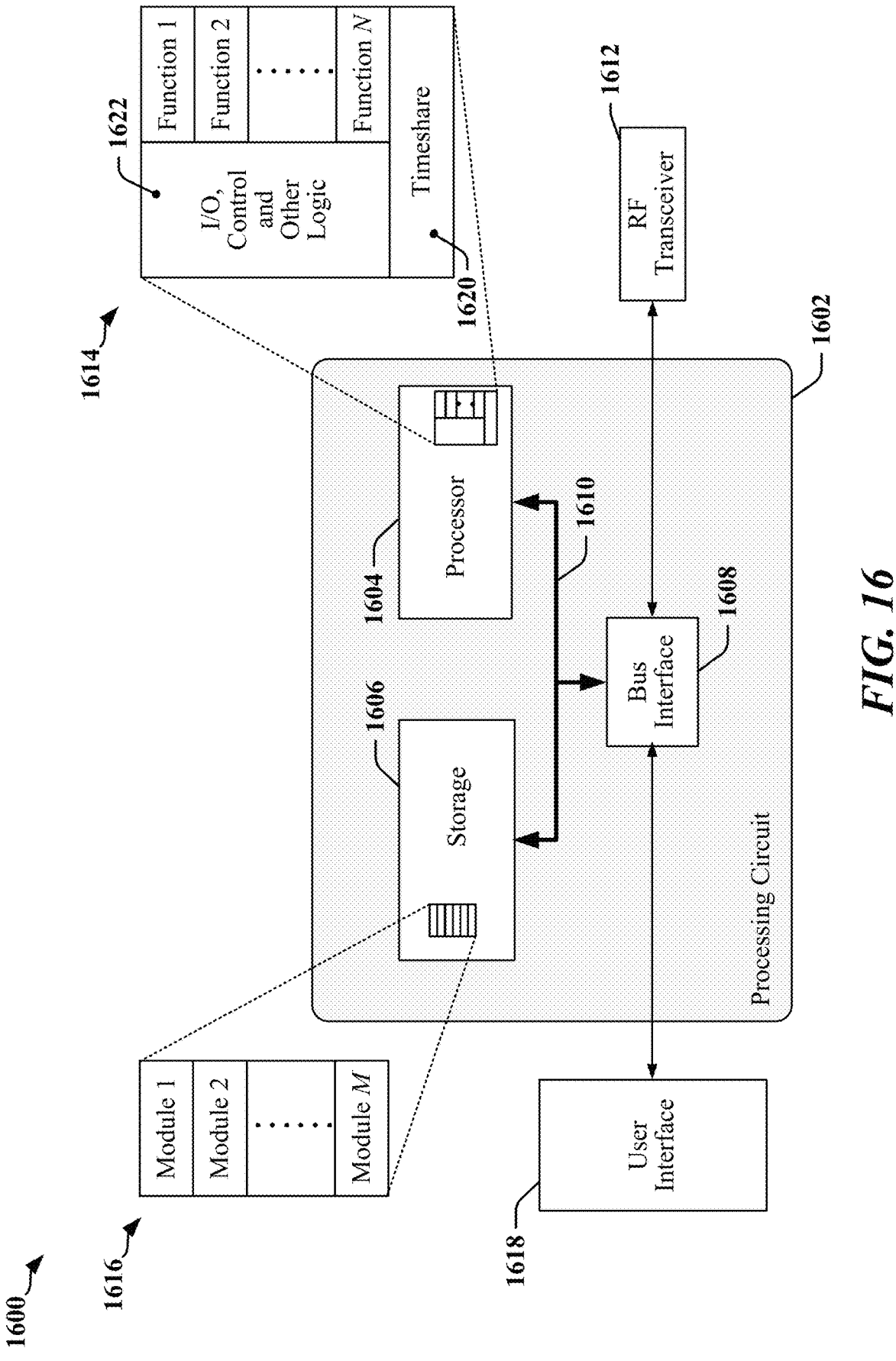
FIG. 16 illustrates one example of an apparatus employing a processing circuit that may be adapted according to certain aspects disclosed herein.

FIG. 16 illustrates an example of a hardware implementation for an apparatus 1600 that may be incorporated in a charging device or in a receiving device that enables a battery to be wirelessly charged. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FP-GAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The storage 1606 may include transitory storage media and/or non-transitory storage media.

The bus 1610 may also link various other circuits such as timing sources, timers, peripherals, voltage regulators, and power management circuits. A bus interface 1608 may provide an interface between the bus 1610 and one or more transceivers 1612. In one example, a transceiver 1612 may be provided to enable the apparatus 1600 to communicate with a charging or receiving device in accordance with a standards-defined protocol. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain and/or organize software in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one implementation, the apparatus 1600 includes or operates as a wireless charging device that has a battery charging power source coupled to a charging circuit, a plurality of charging cells and a controller, which may be included in one or more processors 1604. The plurality of charging cells may be configured to provide a charging surface. At least one coil may be configured to direct an electromagnetic field through a charge transfer area of each charging cell.

In one example, a wireless charging device has a plurality of planar power transmitting coils arranged in two or more layers between a charging surface and a ferrite layer, and a driver circuit configured to provide a charging current to one or more of the plurality of planar power transmitting coils when a chargeable device is placed on or near the wireless charging device. Each planar power transmitting coil may be formed as a spiral winding surrounding a power transfer area. Inductance of each of the plurality of planar power transmitting coils measured at the charging surface varies from a nominal inductance value by less than 10%.

In some examples, inductance of each of the plurality of planar power transmitting coils measured at the charging surface varies from the nominal inductance value by less than 5%. The nominal inductance value may be 34.5 μH in some instances. Other nominal inductance values may be defined based on coil size, spacing and other characteristics of the charging device.

In various examples, each of the plurality of planar power transmitting coils has an outside diameter that is less than a maximum diameter. Each planar power transmitting coil may be formed by spiral winding a multi-strand wire. Each strand in the multi-strand wire may be electrically insulated from each other strand in the multi-strand wire.

In certain examples, the two or more layers include a first layer adjacent to the ferrite layer, and a second layer adjacent to the charging surface. In one example, each coil located in the first layer has a first number of turns and each coil located in the second layer has a second number of turns that is greater than the first number of turns. The two or more layers may further include a third layer adjacent to the first layer, and a fourth layer disposed between the second layer and the charging surface. Each coil located in the third layer may have a third number of turns that is greater than the first number of turns, and each coil located in the fourth layer has a fourth number of turns that is greater than the first number of turns and the third number of turns.

In certain examples, the two or more layers include a first layer adjacent to the ferrite layer, and a second layer adjacent to the charging surface. In one example, each coil located in the first layer has a first inside diameter and each coil located in the second layer has a second inside diameter that is less than the first inside diameter. The two or more layers may also include a third layer adjacent to the ferrite layer, and a fourth layer disposed between the second layer and the charging surface. Each coil located in the third layer may have a third inside diameter that is less than the first inside diameter, and each coil located in the fourth layer has a fourth inside diameter that is less than the first inside diameter.

In one example, the one or more of the plurality of planar power transmitting coils has a number of number of turns configured to provide a matching inductance based on measurement or calculation.

FIG. 17 is a flowchart 1700 illustrating a method for configuring a wireless charging device. At block 1702, a plurality of planar power transmitting coils may be arranged in two or more layers between a charging surface and a ferrite layer. Each planar power transmitting coil may be formed as a spiral winding surrounding a power transfer area.

At block 1704, a driver circuit is configured to provide a charging current to one or more of the plurality of planar power transmitting coils when a chargeable device is placed on or near the wireless charging device. Inductance of each of the plurality of planar power transmitting coils measured at the charging surface varies from a nominal inductance value by less than 10%.

In one example, inductance of each of the plurality of planar power transmitting coils measured at the charging surface varies from the nominal inductance value by less than 5%. The nominal inductance value may be 34.5 μH or another suitable or achievable inductance value.

In certain examples, each of the plurality of planar power transmitting coils has an outside diameter that is less than a maximum diameter. Each planar power transmitting coil may be formed by spiral winding a multi-strand wire. Each strand in the multi-strand wire may be electrically insulated from each other strand in the multi-strand wire.

In some examples, arranging the plurality of planar power transmitting coils includes providing a first layer adjacent to the ferrite layer, and providing a second layer adjacent to the charging surface. Each coil located in the first layer has a first number of turns. Each coil located in the second layer has a second number of turns that is greater than the first number of turns. Arranging the plurality of planar power transmitting coils two or more layers may further include providing a third layer adjacent to the first layer, and providing a fourth layer disposed between the second layer and the charging surface. Each coil located in the third layer has a third number of turns that is greater than the first number of turns. Each coil located in the fourth layer has a fourth number of turns that is greater than the first number of turns and the third number of turns.

In some examples, arranging the plurality of planar power transmitting coils includes providing a first layer adjacent to the ferrite layer, and providing a second layer adjacent to the charging surface. Each coil located in the first layer has a first inside diameter. Each coil located in the second layer has a second inside diameter that is less than the first inside diameter. Arranging the plurality of planar power transmitting coils may further include providing a third layer adjacent to the ferrite layer, and providing a fourth layer disposed between the second layer and the charging surface. Each coil located in the third layer has a third inside diameter that is less than the first inside diameter. Each coil located in the fourth layer has a fourth inside diameter that is less than the first inside diameter.

In one example, one or more of the plurality of planar power transmitting coils has a number of number of turns configured to provide a matching inductance based on measurement or calculation.

FIG. 18 is a flowchart 1800 illustrating a method for calibrating power transmitting coils in a wireless charging device. At block 1802, a plane of measurement is defined. In certain examples, the plane of measurement corresponds to a plane of a charging surface provided by the wireless charging device. The plane of measurement may be aligned with a substrate configured to maintain a plurality of power transmitting coils in planar alignment with the plane of the charging surface. In some examples, inductance of an individual power transmitting coil may be measured at the plane of measurement when the power transmitting coil is inserted into its assigned or designated location within the substrate. In some examples, spacers are used to position the power transmitting coil relative to the plane of measurement to obtain a measurement of the inductance of the power transmitting coil at the plane of measurement that reliably corresponds to the expected inductance at the plane of measurement measured when the power transmitting coil is inserted into its assigned or designated location within the substrate.

At block 1804, a number of turns of wire in each power transmitting coil may be determined. The determined number of turns of wire may be expected to obtain an inductance observable at the plane of measurement for the each power transmitting coil that varies from a nominal inductance value by less than 10%. The number of turns of wire in the power transmitting coil may be proportionate to a distance between the plane of measurement and a location in the substrate designated to receive the each power transmitting coil.

In certain examples, the inductance of each of the plurality of power transmitting coils measured at the charging surface varies from the nominal inductance value by less than 5%. In one example, the nominal inductance value is 34.5 μH.

In certain examples, each of the plurality of power transmitting coils is formed as a planar coil of wire that has an outside diameter that is less than a maximum diameter. Each of the plurality of power transmitting coils may be formed by spiral winding a multi-strand wire. Each strand in the multi-strand wire may be electrically insulated from each other strand in the multi-strand wire. For example, the multi-strand wire may be a Litz wire.

In certain examples, the number of turns of wire in each power transmitting coil may be obtained by determining an effect of a ferrite layer on an electromagnetic field produced at the location in the substrate designated to receive the each power transmitting coil. The number of turns of wire in each power transmitting coil may be obtained by determining an effect of the substrate at the location in the substrate designated to receive the each power transmitting coil when the substrate is manufactured from a low coercivity material.

Some implementation examples are described in the following numbered clauses:

1. A wireless charging device, comprising: a plurality of planar power transmitting coils arranged in two or more layers between a charging surface and a ferrite layer, each planar power transmitting coil being formed as a spiral winding surrounding a power transfer area; and a driver circuit configured to provide a charging current to one or more of the plurality of planar power transmitting coils when a chargeable device is placed on or near the wireless charging device, wherein inductance of each of the plurality of planar power transmitting coils measured at the charging surface varies from a nominal inductance value by less than 10%.

2. The wireless charging device as described in clause 1, wherein inductance of each of the plurality of planar power transmitting coils measured at the charging surface varies from the nominal inductance value by less than 5%.

3. The wireless charging device as described in clause 1 or clause 2, wherein the nominal inductance value is 34.5 μH.

4. The wireless charging device as described in any of clauses 1-3, wherein each of the plurality of planar power transmitting coils has an outside diameter that is less than a maximum diameter.

5. The wireless charging device as described in any of clauses 1-4, wherein each of the plurality of planar power transmitting coils is formed by spiral winding a multi-strand wire, each strand in the multi-strand wire being electrically insulated from each other strand in the multi-strand wire.

6. The wireless charging device as described in any of clauses 1-5, wherein the two or more layers comprise: a first layer adjacent to the ferrite layer, wherein each coil located in the first layer has a first number of turns; and a second layer adjacent to the charging surface, wherein each coil located in the second layer has a second number of turns that is greater than the first number of turns.

7. The wireless charging device as described in clause 6, wherein the two or more layers comprise: a third layer adjacent to the first layer, wherein each coil located in the third layer has a third number of turns that is greater than the first number of turns; and a fourth layer disposed between the second layer and the charging surface, wherein each coil located in the fourth layer has a fourth number of turns that is greater than the first number of turns and the third number of turns.

8. The wireless charging device as described in any of clauses 1-7, wherein the two or more layers comprise: a first layer adjacent to the ferrite layer, wherein each coil located in the first layer has a first inside diameter; and a second layer adjacent to the charging surface, wherein each coil located in the second layer has a second inside diameter that is less than the first inside diameter.

9. The wireless charging device as described in clause 8, wherein the two or more layers comprise: a third layer adjacent to the ferrite layer, wherein each coil located in the third layer has a third inside diameter that is less than the first inside diameter; and a fourth layer disposed between the second layer and the charging surface, wherein each coil located in the fourth layer has a fourth inside diameter that is less than the first inside diameter.

10. The wireless charging device as described in any of clauses 5-7, wherein one or more of the plurality of planar power transmitting coils has a number of number of turns configured to provide a matching inductance based on measurement or calculation.

11. A method for configuring a wireless charging device, comprising: arranging a plurality of planar power transmitting coils in two or more layers between a charging surface and a ferrite layer, each planar power transmitting coil being formed as a spiral winding surrounding a power transfer area; and configuring a driver circuit to provide a charging current to one or more of the plurality of planar power transmitting coils when a chargeable device is placed on or near the wireless charging device, wherein inductance of each of the plurality of planar power transmitting coils measured at the charging surface varies from a nominal inductance value by less than 10%.

12. The method as described in clause 11, wherein inductance of each of the plurality of planar power transmitting coils measured at the charging surface varies from the nominal inductance value by less than 5%.

13. The method as described in clause 11 or clause 12, wherein the nominal inductance value is 34.5 μH.

14. The method as described in any of clauses 11-13, wherein each of the plurality of planar power transmitting coils is formed by spiral winding a multi-strand wire, each strand in the multi-strand wire being electrically insulated from each other strand in the multi-strand wire, and wherein each of the plurality of planar power transmitting coils has an outside diameter that is less than a maximum diameter.

15. The method as described in any of clauses 11-14, wherein arranging the plurality of planar power transmitting coils comprises: providing a first layer adjacent to the ferrite layer, wherein each coil located in the first layer has a first number of turns; and providing a second layer adjacent to the charging surface, wherein each coil located in the second layer has a second number of turns that is greater than the first number of turns.

16. The method as described in clause 15, wherein arranging the plurality of planar power transmitting coils comprises: providing a third layer adjacent to the first layer, wherein each coil located in the third layer has a third number of turns that is greater than the first number of turns; and providing a fourth layer disposed between the second layer and the charging surface, wherein each coil located in the fourth layer has a fourth number of turns that is greater than the first number of turns and the third number of turns.

17. The method as described in any of clauses 11-16, wherein arranging the plurality of planar power transmitting coils comprises: providing a first layer adjacent to the ferrite layer, wherein each coil located in the first layer has a first inside diameter; and providing a second layer adjacent to the charging surface, wherein each coil located in the second layer has a second inside diameter that is less than the first inside diameter.

18. The method as described in clause 17, wherein arranging the plurality of planar power transmitting coils comprises: providing a third layer adjacent to the ferrite layer, wherein each coil located in the third layer has a third inside diameter that is less than the first inside diameter; and providing a fourth layer disposed between the second layer and the charging surface, wherein each coil located in the fourth layer has a fourth inside diameter that is less than the first inside diameter.

19. The method as described in any of clauses 17-18, wherein one or more of the plurality of planar power transmitting coils has a number of number of turns configured to provide a matching inductance based on measurement or calculation.

20. A method for calibrating power transmitting coils in a wireless charging device, comprising: defining a plane of measurement that corresponds to a plane of a charging surface provided by the wireless charging device, the plane of measurement being aligned with a substrate configured to maintain a plurality of power transmitting coils in planar alignment with the plane of the charging surface; and determining a number of turns of wire in each power transmitting coil expected to obtain an inductance observable at the plane of measurement for the each power transmitting coil that varies from a nominal inductance value by less than 10%, the number of turns of wire in the each power transmitting coil being proportionate to a distance between the plane of measurement and a location in the substrate designated to receive the each power transmitting coil.

21. The method as described in clause 20, wherein inductance of each of the plurality of power transmitting coils measured at the charging surface varies from the nominal inductance value by less than 5%.

22. The method as described in clause 20 or clause 21, wherein the nominal inductance value is 34.5 μH.

23. The method as described in any of clauses 20-22, wherein each of the plurality of power transmitting coils comprises a planar coil of wire that has an outside diameter that is less than a maximum diameter.

24. The method as described in any of clauses 20-23, wherein each of the plurality of power transmitting coils is formed by spiral winding a multi-strand wire, each strand in the multi-strand wire being electrically insulated from each other strand in the multi-strand wire.

25. The method as described in any of clauses 20-24, wherein determining the number of turns of wire in each power transmitting coil further comprises: determining an effect of a ferrite layer on an electromagnetic field produced at the location in the substrate designated to receive the each power transmitting coil. a first layer adjacent to the ferrite layer, wherein each coil located in the first layer has a first number of turns.

26. The method as described in any of clauses 20-25, wherein determining the number of turns of wire in each power transmitting coil further comprises: determining an effect of the substrate at the location in the substrate designated to receive the each power transmitting coil when the substrate is manufactured from a low coercivity material.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A wireless charging device, comprising:
a plurality of planar power transmitting coils arranged in two or more layers between a charging surface and a ferrite layer, each planar power transmitting coil being formed as a spiral winding surrounding a power transfer area; and
a driver circuit configured to provide a charging current to one or more of the plurality of planar power transmitting coils when a chargeable device is placed on or near the wireless charging device,
wherein the two or more layers comprise:
a first layer adjacent to the ferrite layer, wherein each coil located in the first layer has a first number of turns;
a second layer adjacent to the charging surface, wherein each coil located in the second layer has a second number of turns that is greater than the first number of turns;
a third layer adjacent to the first layer, wherein each coil located in the third layer has a third number of turns that is greater than the first number of turns; and
a fourth layer disposed between the second layer and the charging surface, wherein each coil located in the fourth layer has a fourth number of turns that is greater than the first number of turns and the third number of turns, and
wherein inductance of each of the plurality of planar power transmitting coils measured at the charging surface varies from a nominal inductance value by less than 10%.

2. The wireless charging device of claim 1, wherein inductance of each of the plurality of planar power transmitting coils measured at the charging surface varies from the nominal inductance value by less than 5%.

3. The wireless charging device of claim 1, wherein the nominal inductance value is 34.5 μH.

4. The wireless charging device of claim 1, wherein each of the plurality of planar power transmitting coils has an outside diameter that is less than a maximum diameter.

5. The wireless charging device of claim 1, wherein each of the plurality of planar power transmitting coils is formed by spiral winding a multi-strand wire, each strand in the multi-strand wire being electrically insulated from each other strand in the multi-strand wire.

6. The wireless charging device of claim 1, wherein one or more of the plurality of planar power transmitting coils has a number of number of turns configured to provide a matching inductance based on measurement or calculation.

7. A wireless charging device, comprising:
a plurality of planar power transmitting coils arranged in two or more layers between a charging surface and a ferrite layer, each planar power transmitting coil being formed as a spiral winding surrounding a power transfer area; and
a driver circuit configured to provide a charging current to one or more of the plurality of planar power transmitting coils when a chargeable device is placed on or near the wireless charging device,
wherein the two or more layers comprise:
a first layer adjacent to the ferrite layer, wherein each coil located in the first layer has a first inside diameter;
a second layer adjacent to the charging surface, wherein each coil located in the second layer has a second inside diameter that is less than the first inside diameter;
a third layer adjacent to the ferrite layer, wherein each coil located in the third layer has a third inside diameter that is less than the first inside diameter; and
a fourth layer disposed between the second layer and the charging surface, wherein each coil located in the fourth layer has a fourth inside diameter that is less than the first inside diameter, and
wherein inductance of each of the plurality of planar power transmitting coils measured at the charging surface varies from a nominal inductance value by less than 10%.

8. A method for configuring a wireless charging device, comprising:
arranging a plurality of planar power transmitting coils in two or more layers between a charging surface and a ferrite layer, each planar power transmitting coil being formed as a spiral winding surrounding a power transfer area; and
configuring a driver circuit to provide a charging current to one or more of the plurality of planar power transmitting coils when a chargeable device is placed on or near the wireless charging device,
wherein arranging the plurality of planar power transmitting coils comprises:
providing a first layer adjacent to the ferrite layer, wherein each coil located in the first layer has a first number of turns;
providing a second layer adjacent to the charging surface, wherein each coil located in the second layer has a second number of turns that is greater than the first number of turns;
providing a third layer adjacent to the first layer, wherein each coil located in the third layer has a third number of turns that is greater than the first number of turns; and
providing a fourth layer disposed between the second layer and the charging surface, wherein each coil located in the fourth layer has a fourth number of turns that is greater than the first number of turns and the third number of turns, and
wherein inductance of each of the plurality of planar power transmitting coils measured at the charging surface varies from a nominal inductance value by less than 10%.

9. The method of claim 8, wherein inductance of each of the plurality of planar power transmitting coils measured at the charging surface varies from the nominal inductance value by less than 5%.

10. The method of claim 8, wherein the nominal inductance value is 34.5 μH.

11. The method of claim 8, wherein each of the plurality of planar power transmitting coils is formed by spiral winding a multi-strand wire, each strand in the multi-strand wire being electrically insulated from each other strand in the multi-strand wire, and wherein each of the plurality of planar power transmitting coils has an outside diameter that is less than a maximum diameter.

12. The method of claim 8, wherein one or more of the plurality of planar power transmitting coils has a number of number of turns configured to provide a matching inductance based on measurement or calculation.

13. A method for configuring a wireless charging device, comprising:

arranging a plurality of planar power transmitting coils in two or more layers between a charging surface and a ferrite layer, each planar power transmitting coil being formed as a spiral winding surrounding a power transfer area;

configuring a driver circuit to provide a charging current to one or more of the plurality of planar power transmitting coils when a chargeable device is placed on or near the wireless charging device, wherein arranging the plurality of planar power transmitting coils comprises:

providing a first layer adjacent to the ferrite layer, wherein each coil located in the first layer has a first inside diameter; and providing a second layer adjacent to the charging surface, wherein each coil located in the second layer has a second inside diameter that is less than the first inside diameter;

providing a third layer adjacent to the ferrite layer, wherein each coil located in the third layer has a third inside diameter that is less than the first inside diameter; and providing a fourth layer disposed between the second layer and the charging surface, wherein each coil located in the fourth layer has a fourth inside diameter that is less than the first inside diameter, and wherein inductance of each of the plurality of planar power transmitting coils measured at the charging surface varies from a nominal inductance value by less than 10%.

\* \* \* \* \*